Aug. 21, 1945.   O. W. PINEO   2,383,075
SPECTROPHOTOMETER
Filed April 29, 1942
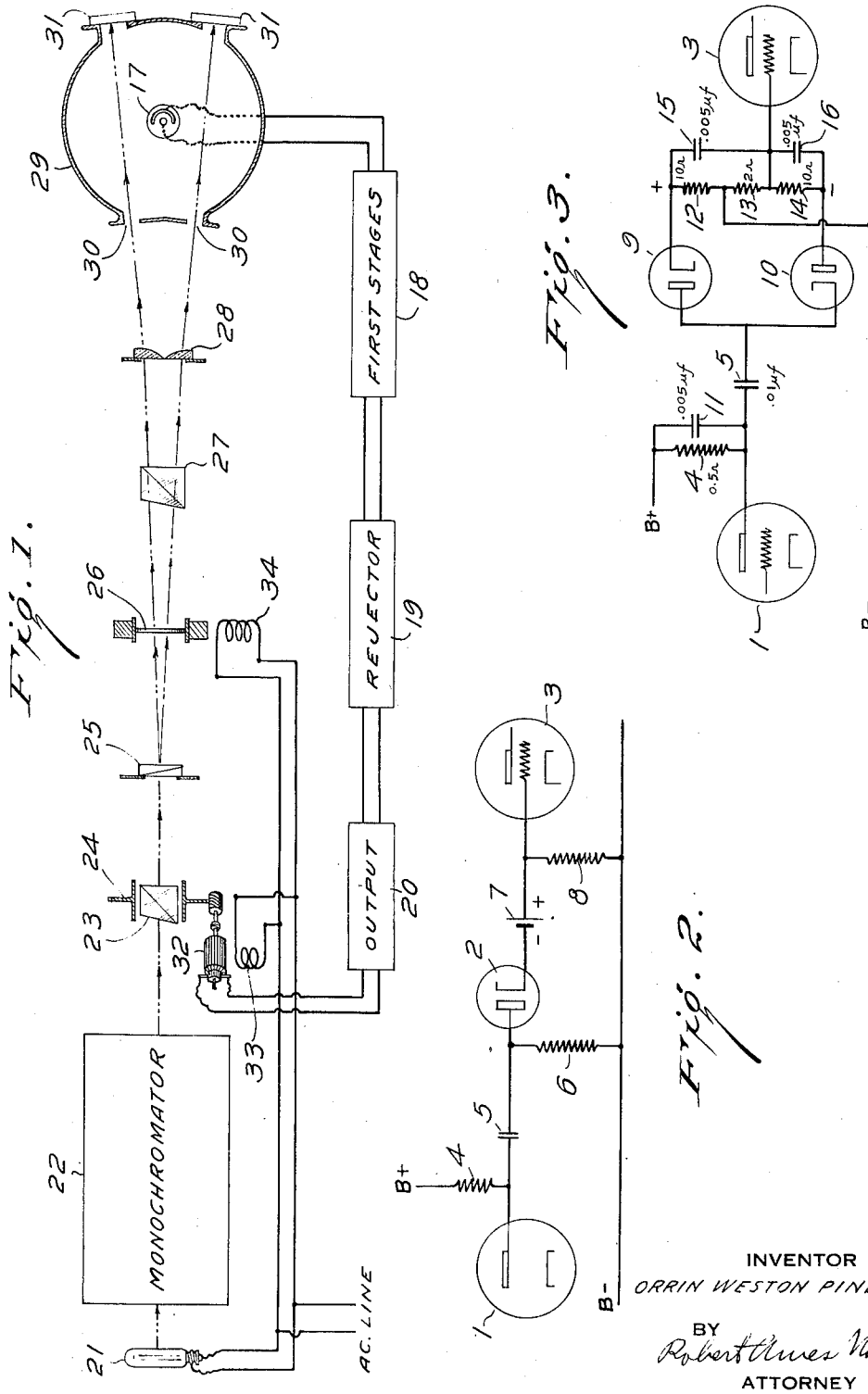
INVENTOR
ORRIN WESTON PINEO,
BY
ATTORNEY Patented Aug. 21, 1945

2,383,075

UNITED STATES PATENT OFFICE 2,383,075

SPECTROPHOTOMETER

Orrin Weston Pineo, Milo, Maine, assignor to American Cyanamid Company, New York, N. Y., a corporation of Maine Application April 29, 1942, Serial No. 441,031

4 Claims. (Cl. 88—14)

This invention relates to amplifiers for photoelectric and similar inputs from spectrophotometers which inputs contain spurious signals at a higher frequency than the signal to be amplified, and more particularly to such amplifiers provided with rejector circuits for said spurious signals.

The present invention is primarily useful in the amplifiers for flickering beam spectrophotometers such as those described in my prior Patents 2,107,836 and 2,126,410. In these machines the light from two flickering beams, one striking a standard and the other a sample, is applied to an audiofrequency amplifier which in turn drives a suitable balance motor for bringing about balance between the beams for various values of reflection or transmission of the given sample at different wave lengths throughout the spectrum. When the flickering beams are close to balance the fluctuation of total light in the integrating sphere at flicker frequency is very small and hence the input to the amplifier at this frequency, which is the signal the amplifier is designed to amplify, is correspondingly very small requiring extremely high amplification in order to obtain sufficient power to operate the balance motor. The ordinary flicker frequency of such machines is 60 cycles when used with 60 cycle A. C. current as this permits extremely high selectivity of response of the balance motor which responds practically only to alternating current of the same frequency as that with which its field is supplied. The problem of obtaining sufficient light in such a machine in narrow wave length bands is a considerable one because a sharp monochromator has to be used and there are considerable light losses throughout the machine. It is customary to use, therefore, a high intensity lamp in the monochromator of such a spectrophotometer and if spurious signals are to be reduced or avoided, it is necessary to use some source of direct current for operating the filament of the lamp. This is troublesome and expensive and it is preferable to operate the lamp from the 60 cycle alternating current line. When so operated, however, the light beams produced by the monochromator show about 5% modulation at 120 cycles and this signal is considerably larger than the minimum 60 cycle signal on which the amplifier is designed to operate. In the case of accurate machines it may amount to some fifty times as great a signal. It is true that the amplifier is tuned to 60 cycles and the motor driven by the amplifier output is even more sharply tuned so that theoretically the spurious 120 cycle signal should not be harmful even though it is much larger in amount than the 60 cycle signal of the amplifier. However, due to the extremely small amount of energy available at flicker frequency near balance, the amplifier has to be operated at an enormously high gain and when a much larger spurious 120 cycle modulation is present, the later stages of the amplifier can be very easily overloaded especially at ranges in the spectrum where the emission of the lamp is fairly high and the sensitivity of the photocell is likewise high. When a small 60 cycle component is so superimposed on a large 120 cycle, the composite wave form resembles that of 120 cycles but alternate peaks have slightly different heights. When the later stages of the amplifier become overloaded, the top peaks are driven into a region where the grid of the next tube takes current, and therefore driving power which the preceding stage cannot supply in sufficient amount. Consequently the grid is not driven far in this region and the peaks are either lost or greatly cut off, and with them the 60 cycle signal. The lower peaks come at far negative grid voltages where there is little amplification, and they too are cut off. The effect is to give poor sensitivity to the instrument when the beams from the integrating sphere are very bright as will occur when a sample is being measured at a wave length at which it has a very high transmission or reflectance and where the lamp emission is also high, particularly in the green or red part of the spectrum.

The present invention is designed to prevent loss of flicker frequency signal by reason of larger amounts of higher frequency light ripple and operates by separating out the peaks of the original wave form and amplifying them.

The invention will be described in greater detail in conjunction with an amplifier shown in the drawing in which:

Fig. 1 is a diagrammatic representation of a flickering beam spectrophotometer and the elements of the high gain amplifier;

Fig. 2 is a diagram of a rejector circuit utilizing positive peaks of the spurious signal; and Fig. 3 is a diagram of a similar rejector circuit utilizing both positive and negative peaks.

Fig. 1 shows in diagrammatic form a spectrophotometer of the type described in the Pineo Patent No. 2,126,410. The output is fed to a high gain amplifier covered by the present invention. A source of light 21 fed from a 60 cycle A. C. line produces light which passes through a conventional monochromator shown diagrammatically at 22 and thence through a photometering Rochon prism 23 mounted in a rotatable sleeve 24 which plane polarizes the light beam. The beam then passes through a Wollaston prism 25 which splits it into two beams, plane polarized at right angles to each other. The two beams pass through a retardation plate 26, preferably a half wave plate, which is rotated by a synchronous motor at one-fourth flicker frequency. In standard machines this is at 15 R. P. S. This results in rotating the plane of polarization of the two beams or in transforming them into elliptically polarized beams, the orientation of the ellipses being rotated. The two beams then pass through a stationary Rochon prism 27 which results in their flickering from maximum to minimum in opposite phase. The flickering beams are then deviated further by decentered lenses 28 and enter an integrating sphere 29 through windows 30. They then strike standard and sample 31 in back of corresponding windows in the rear of the integrating sphere.

The reflected light is integrated in the sphere and is impressed on phototube 17. When the reflected light of the two beams is equal, there will be no pulsation of light at flicker frequency because the total amount of light will remain constant. However, when the sample or standard changes its absorption at a particular wave length light will pulsate in the integrating sphere in phase with the more strongly reflected beam. This is impressed as a flicker frequency signal on the first stages 18 of a high gain audiofrequency amplifier of conventional design. The output of the first stages then passes through a rejector circuit 19 to an output circuit 20. As the present invention is not concerned with the design of either the first stages of the amplifier or the output circuit, these are shown as blocks and may be of any conventional design. The output from 20 is fed to the armature of a motor 32 which drives the photometering prism 23 through suitable gearing. The field 33 of the motor 32 and field 34 of the flicker motor are both supplied from the same source of A. C. current at flicker frequency (in most machines 60 cycles), and the phase is such that the rotation of the motor 32 is in a direction to bring about balance of light in the integrating sphere by decreasing the beam which is more strongly reflected or less strongly absorbed and increasing the other. The motor 32 rotates until balance is again restored and the degree to which the photometering prism is turned is a measure of the difference of absorption at the particular wave length.

Fig. 2 shows diagrammatically a type of rejector circuit shown in Fig. 1 at 19. In this circuit there is an input tube 1, and an output tube 3 shown for the sake of simplicity as triodes. The tube 1 is fed by a suitable source of direct current potential marked B+ through a suitable plate load resistance 4. The alternating current component of the plate circuit passes through the condenser 5 having a capacity C which is connected to the plate of a diode tube 2. A high resistance 6 of resistance R connects the diode plate to the negative line B—. The cathode of the diode is suitably negatively biased, for example by the battery 7, the positive end of which is directly connected to the grid of the output tube 3 of the rejector circuit. A grid leak 8 is provided with a resistance G which as will appear below, may advantageously be considerably smaller than R. The capacity C and the resistance R are chosen to produce a time constant which is relatively large as compared to the time for a single cycle of the spurious ripple. For example, a time constant value RC may equal 6 cycles of the 120 cycle ripple. The bias in the diode circuit may be varied so that small signals can either be transmitted whole or not transmitted at all as desired. For example, if the diode has a zero bias in a representative case, signals with an attenuation of around two times are transmitted and large signals are limited to the peaks necessary to supply sufficient current through the diode and resistance R to bias down the diode end of condenser 5. If a time constant RC is about 6 cycles of 120 cycle light ripple, only the top ⅙ of the positive half of each wave form will be transmitter, provided a grid leak of suitable low resistance G is provided. If the grid leak resistance is increased, the gain of the stage is increased, and the fraction of the wave form transmitted is also increased. Diode bias and grid leak size should be chosen so that under normal operating conditions, there will be no overloading of the grid of tube 3.

The circuit shown in Fig. 2 utilizes only one half of the wave because a single diode rectifier is employed. A somewhat more efficient form utilizing both top and bottom peaks of the wave is shown in Fig. 3 in which the same elements are given the same reference numerals. In this figure also the numerical values of the different resistances and capacities are given for a typical amplifier operating with 60 cycle signal and 120 cycle ripple. The circuit of the input tube 1 is substantially the same as the one in Fig. 2 except that the plate resistance 4 is shown as by-passed with a small condenser 11 and the condenser 5, instead of being connected to the plate of a single diode is connected to the plate of one diode 9 and the cathode of another diode 10. The cathode of diode 9 is connected through a resistance circuit made up of resistances 12, 13, and 14 to the plate of the other diode. The point of the circuit between resistors 12 and 13 is connected to B— and the point between resistors 13 and 14 is connected to the grid of output tube 3 which grid is likewise connected to the cathode of diode 9 and the plate of diode 10 through the equal condensers 15 and 16. The symbols + and — indicate the high and low potential portions of the series diode circuit. The diode 9 responds to the tops of the 120 cycle peaks and the diode 10 to the bottom peaks. The portions of the circuit resulting in the time constant referred to in Fig. 2 are the condenser 15 and resistance 12 and condenser 16 and resistance 14, respectively. In a period $t$ of one cycle of the 120 cycle ripple, each of the condensers 15 and 16 leaks off from the voltage E to which they are charged by the top and bottom peaks of the ripple an amount $dE$ due to the current E/R out of its capacity C. The quantity of electricity is given by the following equations:

$$A = \frac{Et}{R} = CdE$$

$dE/E = t/RC$, and hence the fraction of the waveform transmitted $= t/T$, (since $RC = T$).

In order to keep the tops of the transmitted signal at a constant level, the grid leak 13 should be approximately in the same proportion to the time constant resistances 12 and 14 as the time constant is to the time for one cycle of the ripple current. In other words, the grid leak 13 should be approximately ⅙ and is shown as 3 megohms.

The amplifier system of the present invention is shown purely diagrammatically and for simplicity triode tubes are shown and separate diode tubes. Of course, any other suitable amplifying tubes may be used and a double diode with separate cathodes in a single envelope may be employed. The time constants to be chosen for the circuits are illustrated in Fig. 3 for a situation where the spurious ripple at maximum amounts to about 50 times the minimum signal and where flicker frequency is about 60 cycles and spurious ripple about 120. In machines where these quantities differ, suitable changes in the time constants and the other constants of the rejector circuit should be made.

The amplifiers of the present invention are shown in Fig. 1 as applied to an instrument employing a photocell which is the common arrangement for spectrophotometers operating in the visible spectrum. The amplifier circuits are, however, not concerned with the past history of the electric currents which they receive and hence are applicable for use in flickering beam spectrophotometers operating in either the ultraviolet or the infrared. In the latter case photocells may be employed for the very near infrared or in the very far infrared, thermocouples, bolometers, or other suitable devices will be employed. In every case, however, the same problem of overloading of the later amplifier stages arises, and the present invention avoids the difficulties encountered in exactly the same way.

As shown in Figs. 2 and 3, the output tube 3 feeds a further amplifier stage. This is not essential as tube 3 can, under certain circumstances actually be the power output 2. However, it is in general desirable to locate the rejector circuit at the point where its output tube feeds into a further stage of amplification. It is also desirable to locate the rejector circuit at the earliest point at which overload will take place because obviously in a highly sensitive amplifier if overloading takes place in the stage feeding tube 1, the damage in signal loss will have occurred before the rejector circuit has been able to act. The location, therefore, should be chosen so that no overloading will normally occur before the rejector circuit. On the other hand, it is not desirable to locate the rejector circuit too near the first stage, as it must have sufficient energy to satisfactorily operate the diodes and their associated circuits. The exact location of the rejector circuit will be determined in every case by a consideration of the load in the particular circuits of the particular amplifier.

What I claim is:

1. In a flickering beam spectrophotometer utilizing an integrating sphere and a source of illumination operated by alternating current which produces in the integrating sphere a spurious light pulsation of frequency higher than the flicker frequency resulting from operation of the flickering mechanism of the spectrophotometer, the integrated light from the integrating sphere being impressed on a photoelectric device capable of transforming the light pulsations into electric currents, said photoelectric device feeding a high gain audiofrequency vacuum tube amplifying means, the improvement which comprises a rejector circuit fed by the first stages of the amplifying means and followed by at least one amplifying output stage, said rejector circuit including at least one diode vacuum tube in series between the output of the preceding stage and the control grid of the succeeding stage, said diode being provided with a capacity and resistance circuit having a time constant greater than the period of a single cycle of the spurious signal and a grid leak for the control grid of the succeeding amplifying stage.

2. A flickering beam spectrophotometer according to claim 1 in which the grid leak is smaller than the resistance in the circuit forming the time constant.

3. In a flickering beam spectrophotometer utilizing an integrating sphere and a source of illumination operated by alternating current which produces in the integrating sphere a spurious light pulsation of frequency higher than the flicker frequency resulting from operation of the flickering mechanism of the spectrophotometer, the integrated light from the integrating sphere being impressed on a photoelectric device capable of transforming the light pulsations into electric currents, said photoelectric device feeding a high gain audiofrequency vacuum tube amplifying means, the improvement which comprises a rejector circuit fed by the first stages of the amplifying means and followed by at least one amplifying output stage, said rejector circuit including at least two diode tubes, the anode of one diode being connected to the cathode of the second diode and to the output from the preceding stage, the cathode of the first diode tube and the anode of the second diode tube being connected to the control grid of the succeeding stage through resistance and capacity circuits each having a time constant larger than the time for a single cycle of the spurious signal and a grid leak for the control grid of the succeeding amplifying stage.

4. A spectrophotometer according to claim 3 in which the grid leak for the succeeding amplifying stage is smaller than the resistance in either of the two circuits of the rejector circuit forming time constants.

ORRIN WESTON PINEO.